United States Patent
Collins et al.

(10) Patent No.: US 10,778,847 B1
(45) Date of Patent: Sep. 15, 2020

(54) PROXIMATE NOISE DUPLICATION PREVENTION

(71) Applicant: Lenovo (Singapore) Pte. Ltd., Singapore (SG)

(72) Inventors: Sandy Scott Collins, Durham, NC (US); Justin Michael Ringuette, Morrisville, NC (US); Richard Todd Wall, Clayton, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/541,870

(22) Filed: Aug. 15, 2019

(51) Int. Cl.
*H04M 3/56* (2006.01)
*H04M 9/08* (2006.01)

(52) U.S. Cl.
CPC ........... *H04M 3/568* (2013.01); *H04M 3/563* (2013.01); *H04M 9/082* (2013.01)

(58) Field of Classification Search
CPC ....... H04M 3/568; H04M 3/563; H04M 9/082

USPC ........................................ 379/204.01, 202.01
See application file for complete search history.

(56) References Cited

U.S. PATENT DOCUMENTS

| | | | | |
|---|---|---|---|---|
| 2012/0306823 | A1* | 12/2012 | Pance | H04R 1/028 345/177 |
| 2015/0085064 | A1* | 3/2015 | Sanaullah | H04M 3/568 348/14.08 |
| 2018/0277136 | A1* | 9/2018 | Pratt | H04N 7/147 |

* cited by examiner

*Primary Examiner* — Quynh H Nguyen
(74) *Attorney, Agent, or Firm* — Ference & Associates LLC

(57) ABSTRACT

One embodiment provides a method, including: identifying, using an information handling device, a proximate sound source; determining, using a processor, that noise produced by the proximate sound source is duplicated on a conference bridge that a user is connected to and is within an audible range of the user; and preventing, based on the determining, the noise on the conference bridge from reaching the user. Other aspects are described and claimed.

18 Claims, 3 Drawing Sheets

PROXIMATE NOISE DUPLICATION PREVENTION

BACKGROUND

Individuals frequently utilize their information handling devices ("devices"), for example, smart phones, tablet devices, laptop and/or personal computers, and the like, to engage in audible conversations with other individuals. Various conferencing applications may allow a multitude of individuals to interact with each other substantially simultaneously. More particularly, a conference bridge may be leveraged to allow participants to dial into a virtual meeting from their own device.

BRIEF SUMMARY

In summary, one aspect provides a method, comprising: identifying, using an information handling device, a proximate sound source; determining, using a processor, that noise produced by the proximate sound source is duplicated on a conference bridge that a user is associated with and is within an audible range of the user; and preventing, based on the determining, the noise on the conference bridge from reaching the user.

Another aspect provides an information handling device, comprising: a memory device that stores instructions executable by the processor to: identify a proximate sound source; determine that noise produced by the proximate sound source is duplicated on a conference bridge that a user is associated with and is within an audible range of the user; and prevent, based on the determining, the noise on the conference bridge from reaching the user.

A further aspect provides a product, comprising: a storage device that stores code, the code being executable by a processor and comprising: code that identifies a proximate sound source; code that determines that noise produced by the proximate sound source is duplicated on a conference bridge that a user is associated with and is within an audible range of a user; and code that prevents, based on the determining, the noise on the conference bridge from reaching the user.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
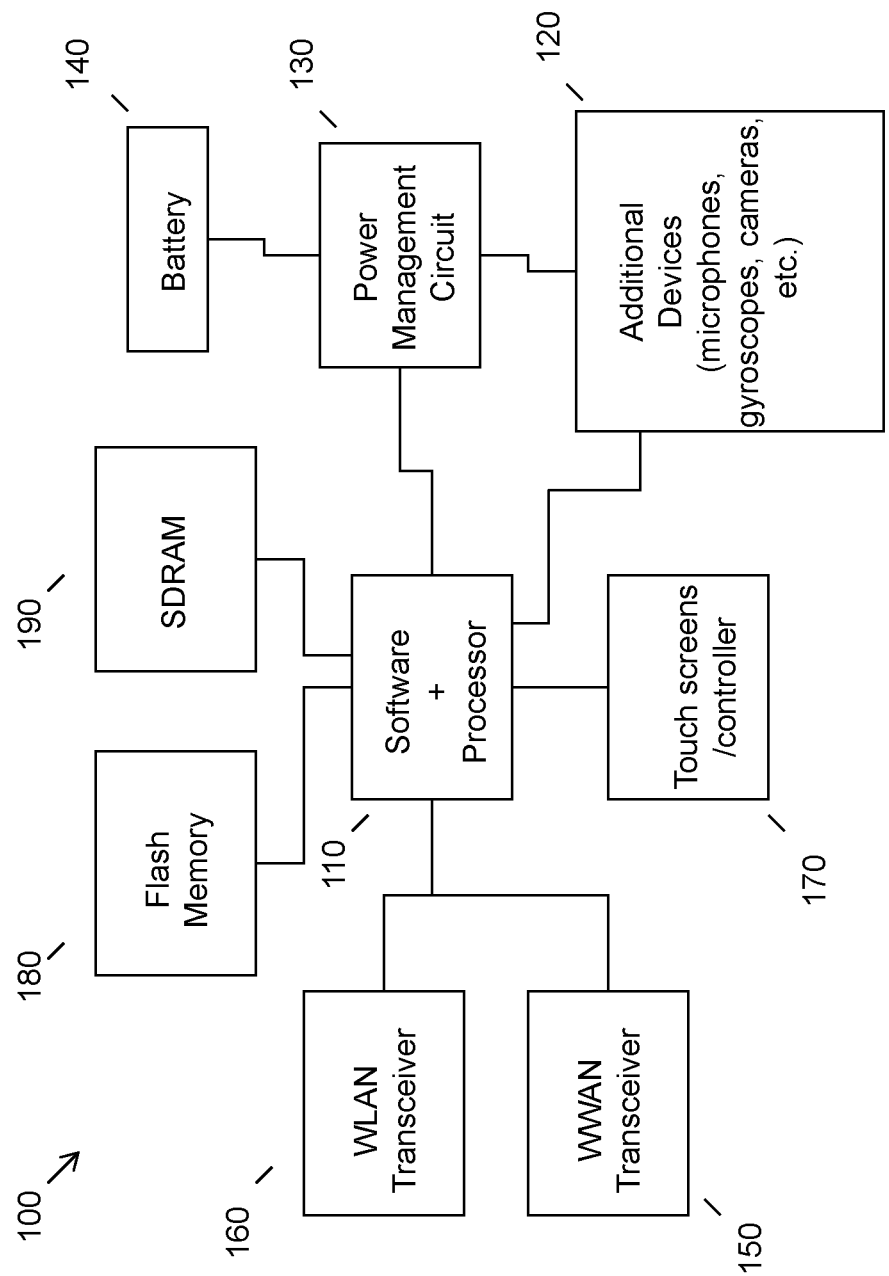
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As technology has progressed, virtual conferencing has become the core of collaboration and has facilitated the enablement of distributed or virtual teams. Combined with Voice over Internet Protocol (VoIP) connectivity for remote workers, conferencing makes it simple and affordable for a team to function across a diverse geography. Depending on the conferencing application utilized, dozens or even hundreds of participants may be able to access a singular virtual conference.

A common situation that arises is that multiple proximate individuals may be participants to the same conference. For example, User A and User B may be physically proximate to one another and may also both be connected to the same conference bridge on their respective devices. In this situation, User A may experience an echoing effect from audible input provided by User B. More particularly, User A may first hear the in-person audible input provided by User B and may thereafter hear, in the conference call, a duplication of the same input. This type of echoing may be annoying and may have a negative effect on the user experience.

Conventional solutions may employ the use of one or more noise-cancelling devices. For example, a user may be equipped with a pair of noise-cancelling headphones that may block, or significantly diminish, the ambient sounds they may normally hear in their environment. However, these headphones are not perfect in that some sounds may still filter through. Additionally, these noise-cancelling devices are currently expensive to acquire, thereby making it unfeasible for most companies to equip each worker with such an expensive device.

Accordingly, an embodiment provides a method for preventing an echo of a noise originating from a source proximate to the user from being duplicated on a call engaged in by the user. In an embodiment, a proximate sound source (e.g., a human-based sound source, an animal-based sound source, an object-based sound source, etc.) within an audible range of a user may be identified or detected. An embodiment may then determine that the noise produced by the proximate sound source is being duplicated on a call a user is engaged in. Stated differently, an embodiment may be able to determine that the user may be able to hear an echo of the proximate noise on the call. Thereafter, an embodiment may prevent the noise occurring on the call from reaching the user. Such a method may ensure that a user is not subject to an echoing effect from proximate sounds.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, etc. System 100 often includes one or more touch screens 170 for data input and display/rendering. System 100 also typically includes various memory devices, for example flash memory 180 and SDRAM 190.

Figure 2:
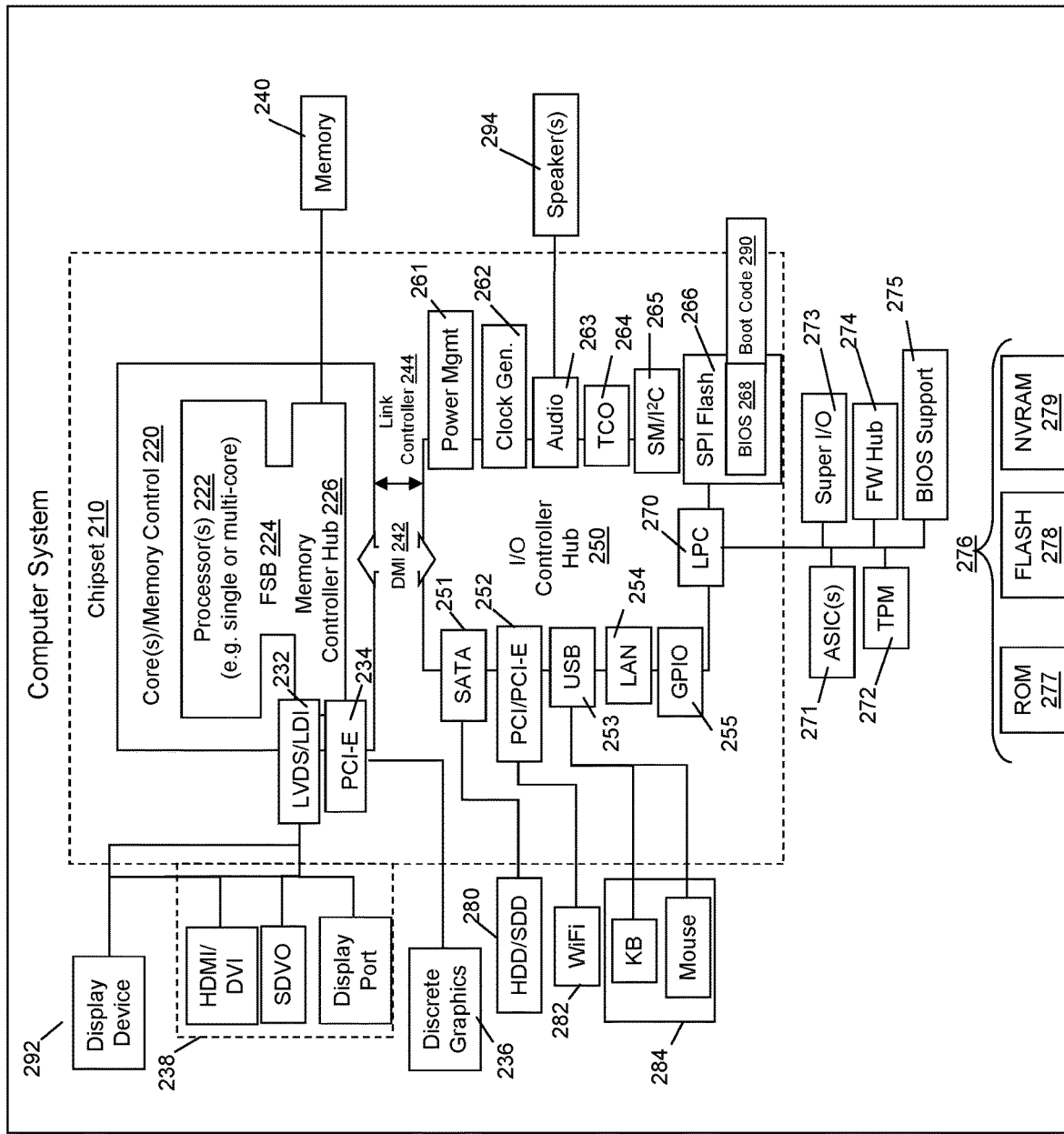
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices smart phones, tablets, laptop and/or person computers, and/or other electronic devices that may be able to effectively support conferencing applications. For example, the circuitry outlined in FIG. 1 may be implemented in a headset embodiment, whereas the circuitry outlined in FIG. 2 may be implemented in a laptop.

Figure 3:
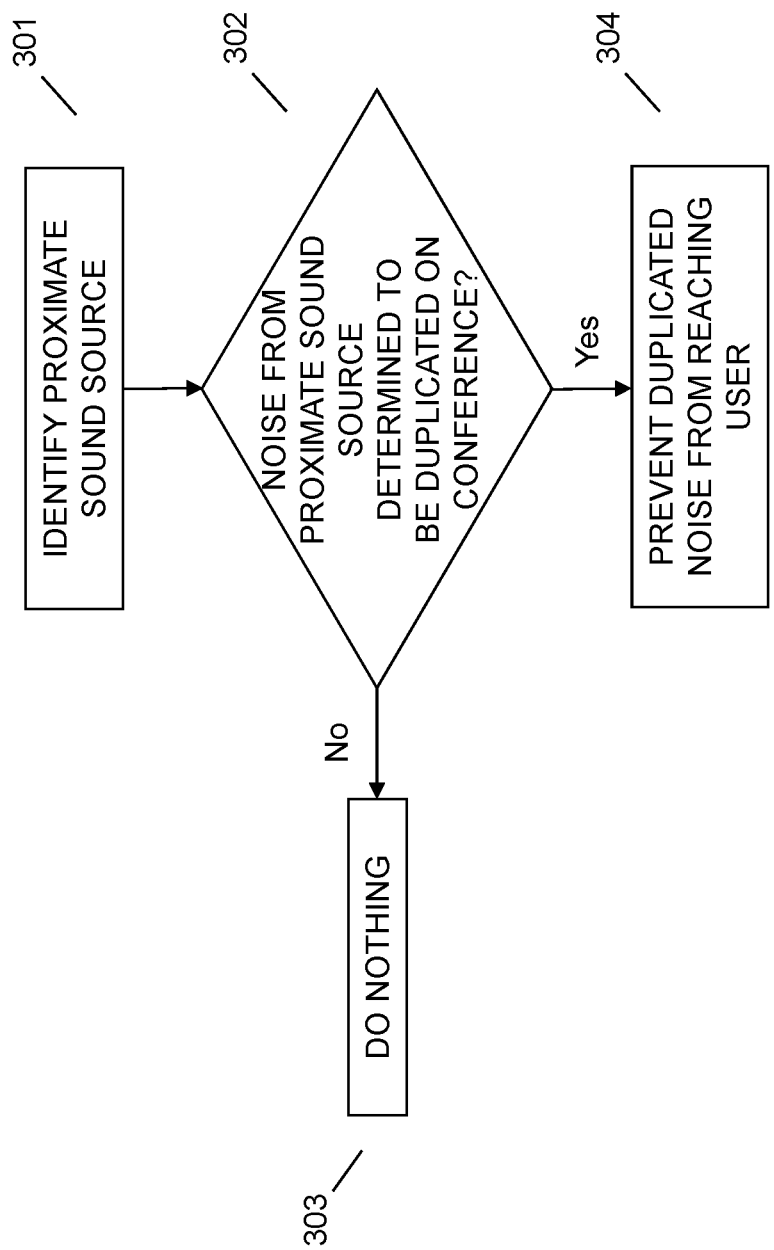
FIG. 3 illustrates an example method of preventing proximate noise duplication.

Referring now to FIG. 3, an embodiment may prevent an echo produced by a proximate sound source from being registered by a user engaged in a conference. At 301, an embodiment may identify, or detect, a presence of a proximate sound source within an audible range of a user. In an embodiment, the proximate sound source may be virtually any sound source capable of producing audio that a user can hear. For example, the proximate sound source may be associated with another proximate individual, an animal, an object (e.g., an alarm, noise from another device such as a television, etc.). The proximity of the sound source may only be limited by the user's ability to hear sound generated from the source. Stated differently, a distant source that emits a very loud sound that is hearable by a user and a closer source that emits a quieter sound that is still hearable by a user may both be considered proximate sound sources.

In an embodiment, the noise produced by the proximate sound source may be detected by another device connected to a conference bridge that a user's device is also connected to. For example, another user (i.e., User B) may be equipped with a device that is connected to the same conference call as the device of the primary user. Accordingly, assuming User B is the proximate sound source, User B's device may be able to register audible input provided by User B. The conventional effect of this arrangement is that the primary user may be able to hear the audio provided by User B in-person as well as through the conference bridge, thereby creating an echoing effect.

In an embodiment, the proximate sound source may be identified using one or more techniques. The identification process may simply confirm a presence of a proximate sound source rather than positively determining its identity. In this situation, the identification may be conducted by, for example, identifying any captured sound that does not correspond to sound known to be provided by a user. Additionally or alternatively, an embodiment may access one or more other data sources that may confirm the presence of a proximate sound. Conversely, an embodiment may determine the true identity of the proximate the proximate sound source. For example, if the proximate sound source is another individual, an embodiment may be able to identify who that individual is by using one or more available data sources (e.g., from manual designation, acoustic analysis, available context data, etc.).

For simplicity purposes, the remainder of this application will be described with reference to a proximate individual as the proximate sound source. However, such a designation is not limiting and a skilled person will recognize that the other sound sources described above may be a proximate sound source.

At 302, an embodiment may determine that noise produced by the proximate sound source is duplicated on a conference bridge that the user is connected to. More particularly, an embodiment may determine that the aforementioned echoing effect is present. The determination may be facilitated using one or more techniques, which are further described below.

In an embodiment, the determination may be conducted by first capturing the noise produced by the proximate sound source using an audio capture device (e.g., a microphone, etc.) integrally or operatively coupled to the user's device. Audible characteristics of the noise may be analyzed (e.g., using one or more conventional acoustic analysis techniques, etc.) and compared to sound coming from the conference bridge. If an embodiment identifies that the one or more audible characteristics of the captured noise share a predetermined level of similarity (e.g., 75% similarity, 90% similarity, etc.) with one or more audible characteristics of the sound coming from the conference bridge, an embodiment may conclude that an echoing effect is present.

In another embodiment, the determination may be conducted by first receiving a designation of a proximate sound source. The designation may be, for example, an explicit, manual designation from a user. More particularly, if a user knows that a proximate sound source will likely be present on a conference call and will likely produce an echoing effect, a user may provide an indication of the proximate sound source's presence and/or identity before the call begins. Additionally or alternatively, knowledge of one or more proximate sound sources may be dynamically determined by an embodiment (e.g., by identifying the likely presence of a proximate sound source from available calendar, meeting, or communication data, etc.). In an embodiment, the designation of the proximate sound source may be accompanied with known audible characteristics of the source. For example, many companies contain a database comprising sound signatures of their employees. If Employee A and Employee B are designated as being on a conference call with and in physical proximity to User A, then the audible characteristics of each of their sound signatures may be pulled. An embodiment may thereafter determine if any of these known audible characteristics share a predetermined level of similarity with audible characteristics of sound originating from the conference bridge. If a positive determination is made, then an embodiment may conclude that an echoing effect is present.

An embodiment may determine that the proximate sound source is a recurring proximate sound source. Stated differently, the proximate sound source may be a sound source that is frequently present when a user is engaged in a particular conference call. For example, a group of individuals may convene weekly for a conference call. Based upon the knowledge that the presence of these individuals will be recurring for this particular conference call, an embodiment may automatically be primed to monitor for acoustic characteristics associated with these individuals in the conference bridge. The knowledge of the weekly presence of these proximate sound sources may be derived manually from a user, dynamically from available data source, etc.

Responsive to determining, at 302, that an echoing effect is not present (i.e., that audible noise produced by the proximate sound source is not duplicated on a conference bridge connected to by a user), an embodiment may, at 303, take no additional action. Conversely, responsive to determining, at 302, that an echoing effect is present (i.e., that audible noise produced by the proximate sound source is duplicated on a conference bridge connected to by a user), an embodiment may, at 304, prevent the duplicated noise traveling over the conference bridge from reaching the user.

In an embodiment, the duplicated noise may be prevented from being emitted through one or more audio output devices associated with the user. For example, a user may be equipped with a wearable headset that includes integrated speakers/headphones. Upon a positive determination, the duplicated noise may be prevented from emitted through the speakers in the user's headset. In this way, the user may only hear the noise once (i.e., in person). In an embodiment, the prevention may occur automatically and without any additional user input. Stated differently, the preventative action may occur at substantially the moment a positive determination is made and may not require any additional action to be taken by the user to block the duplicated noise.

The various embodiments described herein thus represent a technical improvement to conventional methods of preventing a user from hearing duplicated sound. Using the techniques described herein, an embodiment may identify/detect a proximate sound source. The proximate sound source may be a sound source capable of producing a sound that is within an audible hearing range of a user. An embodiment may then determine whether noise produced by the proximate sound source is duplicated on a conference bridge. Responsive to arriving at a positive determination, an embodiment may prevent the duplicated sound from reaching the user (e.g., the duplicated sound may be blocked from being transmitted through the speakers of a user's device, etc.). Such a method may reduce or eliminate instances of an echoing effect derived from proximate sound sources.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    identifying, using an information handling device, a proximate sound source;
    determining, using a processor, that noise produced by the proximate sound source is duplicated on a conference bridge that a user is connected to and is within an audible range of the user, wherein the determining comprises:
        identifying that the conference bridge is associated with a recurring conference call; and
        identifying that the proximate sound source is a recurring sound source substantially always present during the recurring conference call; and
    preventing, based on the determining, the noise on the conference bridge from reaching the user.

2. The method of claim 1, wherein the proximate sound source is associated with a proximate object.

3. The method of claim 1, wherein the proximate sound source is associated with a proximate individual.

4. The method of claim 1, wherein the noise produced by the proximate sound source is registered by another device connected to the conference bridge.

5. The method of claim 1, wherein the determining further comprises:
    capturing, using a microphone associated with the information handling device, the noise;
    comparing the captured noise to sound detected on the conference bridge; and
    identifying that the captured noise shares a predetermined level of similarity to the sound on the conference bridge.

6. The method of claim 1, wherein the determining further comprises:
    detecting a manual designation of the proximate sound source;
    receiving an indication of audible characteristics of the noise produced by the proximate sound source; and
    determining that audible characteristics of sound detected on the conference bridge share a predetermined level of similarity with the audible characteristics of the noise.

7. The method of claim 1, wherein the preventing comprises preventing the noise from being transmitted through speakers associated with the user.

8. The method of claim 7, wherein the speakers are integrated into a headset worn by the user.

9. The method of claim 1, wherein the preventing comprises preventing without receiving any additional user input.

10. An information handling device, comprising:
    a memory device that stores instructions executable by the processor to:
    identify a proximate sound source;
    determine that noise produced by the proximate sound source is duplicated on a conference bridge that a user is associated with and is within an audible range of the user, wherein the instructions executable by the processor to determine comprise instructions executable by the processor to:
  identify that the conference bridge is associated with a recurring conference call; and
  identify that the proximate sound source is a recurring sound source substantially always present during the recurring conference call; and
prevent, based on the determining, the noise on the conference bridge from reaching the user.

11. The information handling device of claim 10, wherein the proximate sound source is associated with a proximate object.

12. The information handling device of claim 10, wherein the proximate sound source is associated with a proximate individual.

13. The information handling device of claim 10, wherein the noise produced by the proximate sound source is registered by another device connected to the conference bridge.

14. The information handling device of claim 10, wherein the instructions executable by the processor to determine further comprise instructions executable by the processor to:
  capture, using a microphone associated with the information handling device, the noise;
  compare the captured noise to sound detected on the conference bridge; and
  identify that the captured noise shares a predetermined level of similarity to the sound on the conference bridge.

15. The information handling device of claim 10, wherein the instructions executable by the processor to determine further comprise instructions executable by the processor to:
  detect a manual designation of the proximate sound source;
  receive an indication of audible characteristics of the noise produced by the proximate sound source; and
  determine that audible characteristics of sound detected on the conference bridge share a predetermined level of similarity with the audible characteristics of the noise.

16. The information handling device of claim 10, wherein the instructions executable by the processor to prevent comprise instructions executable by the processor to prevent the noise from being transmitted through speakers associated with the user.

17. The information handling device of claim 10, wherein the instructions executable by the processor to prevent comprise instructions executable by the processor to prevent without receiving any additional user input.

18. A product, comprising:
A non-transitory storage device having computer readable program code stored therewith, the computer readable program code comprising:
computer readable program code that identifies a proximate sound source;
computer readable program code that determines that noise produced by the proximate sound source is duplicated on a conference bridge that a user is associated with and is within an audible range of the user, wherein the computer readable program code that determines comprises computer readable program code that:
  identifies that the conference bridge is associated with a recurring conference call; and
  identifies that the proximate sound source is a recurring sound source substantially always present during the recurring conference call; and
computer readable program code that prevents, based on the determining, the noise on the conference bridge from reaching the user.

* * * * *